United States Patent [19]
Gerhardinger et al.

[11] Patent Number: 5,626,668
[45] Date of Patent: May 6, 1997

[54] PROCESS FOR THE WATER-REPELLENT IMPREGNATION OF PLASTER

[75] Inventors: Dieter Gerhardinger; Richard Weidner; Hans Mayer, all of Burghausen, Germany

[73] Assignee: Wacker-Chemie GmbH, Munich, Germany

[21] Appl. No.: 629,667

[22] Filed: Apr. 9, 1996

[30] Foreign Application Priority Data

Apr. 20, 1995 [DE] Germany ............... 195 14 639.5

[51] Int. Cl.$^6$ ............... C04B 11/00; C04B 24/40
[52] U.S. Cl. ............... 106/781; 106/2; 106/287.13; 106/287.14
[58] Field of Search ............... 106/781, 2, 287.13, 106/287.14

[56] References Cited

U.S. PATENT DOCUMENTS

| | | | |
|---|---|---|---|
| 3,455,710 | 7/1969 | Nitzsche et al. | 106/781 |
| 3,623,895 | 11/1971 | Nitzsche et al. | 106/781 |
| 4,371,399 | 2/1983 | May et al. | 106/781 |
| 4,411,701 | 10/1983 | Saito et al. | 106/781 |
| 4,411,702 | 10/1983 | Makino et al. | 106/781 |
| 4,486,476 | 12/1984 | Fritsch et al. | 427/387 |
| 4,757,106 | 7/1988 | Mayer et al. | 524/262 |
| 4,975,122 | 12/1990 | Parkinson et al. | 106/781 |
| 5,135,805 | 8/1992 | Sellers et al. | 106/781 |

FOREIGN PATENT DOCUMENTS

| | | | |
|---|---|---|---|
| 249423 | 5/1963 | Australia | 106/781 |
| 58388 | 8/1982 | European Pat. Off. | 106/781 |
| 1337188 | 7/1963 | France | 106/781 |
| 2153579 | 5/1973 | France | 106/781 |
| 51-019023 | 2/1976 | Japan | 106/781 |
| 51-058418 | 5/1976 | Japan | 106/781 |
| 873805 | 7/1961 | United Kingdom | 106/781 |
| 929375 | 6/1963 | United Kingdom | 106/781 |
| 2059413 | 4/1981 | United Kingdom | 106/781 |
| 81/01702 | 6/1981 | WIPO | 106/781 |

OTHER PUBLICATIONS

Derwent Abstract AN 77–13326Y, abstract of FR 2308602 (Dec. 1976).

Derwent Abstract AN 82–64075E, abstract of FR 2496090 (Jun. 1982).

Derwent Abstract AN 66–09264F, abstract of FR 1337188 (Sep. 1963).

*Primary Examiner*—Anthony Green
*Attorney, Agent, or Firm*—Martin Connaughton

[57] ABSTRACT

Water-repellent plaster compositions comprising the constituents (A) 100 parts by weight of gypsum plaster, (B) from 0.05 to 50 parts by weight of oxide or hydroxide of alkali or alkaline earth metals or a mixture thereof, and (C) from 0.05 to 20 parts by weight of an organopolysiloxane which has hydroxyl and/or alkoxy groups bonded to silicon atoms.

7 Claims, No Drawings

PROCESS FOR THE WATER-REPELLENT IMPREGNATION OF PLASTER

FIELD OF THE INVENTION

The present invention relates to water-repellent plaster compositions comprising an oxide or hydroxide of alkali or alkaline earth metals or mixtures of an oxide or hydroxide of alkali or alkaline earth metals and an organopolysiloxane which has hydroxyl and/or alkoxy groups bonded to silicon atoms, and a process for the water-repellent treatment of plaster.

BACKGROUND OF INVENTION

U.S. Pat. No. 3,455,710 describes plaster which can be given water-repellent properties by impregnation with organosiloxanes containing Si-bonded hydrogen atoms (H-siloxanes). This reference also describes the impregnation of mixtures of plaster and calcium hydroxide with H-siloxanes. However, the water-repellent action of the H-siloxanes is unsatisfactory. The H-siloxanes are expensive and evolve hydrogen on contact with water.

U.S. Pat. No. 4,411,702 describes water-repellent shaped articles which are produced from the constituents calcium sulphate dihydrate, slag and calcium hydroxide and in the production of which part of the constituents is treated with a polydimethylsiloxane liquid. However, the water-repellent action of the polydimethylsiloxane liquid is unsatisfactory.

SUMMARY OF THE INVENTION

It is an object of the present invention to provide low-cost and easy-to-process water-repellent plaster compositions and shaped articles which can be produced therefrom.

The present invention provides water-repellent plaster compositions comprising the constituents (A) 100 parts by weight of gypsum plaster, (B) from 0.05 to 50 parts by weight of an oxide, or hydroxide of alkali or alkaline earth metals or a mixture thereof, (C) from 0.05 to 20 parts by weight of organopolysiloxane which has hydroxyl and/or alkoxy groups bonded to silicon atoms.

The water-repellent plaster compositions can comprise any type of calcium sulphate. Among the type of calcium sulphate, preference is given to plaster ($CaSO_4 \cdot H_2O$) in the form of building plaster, stucco plaster or insulation plaster and plaster of Paris ($CaSO_4 \cdot \frac{1}{2}H_2O$). Other types of plaster such as screed plaster, marble plaster and anhydrite can also be used. The calcium sulphate formed in flue gas desulphurization is also well suited.

As oxide and/or hydroxide of alkali and/or alkaline earth metals (B), preference is given to CaO, MgO, $Ca(OH)_2$, $Mg(OH)_2$ and NaOH, in particular $Ca(OH)_2$, CaO and NaOH.

Preference is given to using, based on 100 parts by weight of gypsum plaster (A), from 0.1 to 35, in particular from 0.5 to 25 parts by weight parts of oxide and/or hydroxide (B).

The organopolysiloxane (C) is made up of units of the formula

$$R_a(OR')_b SiO_{(4-a-b)/2} \qquad (I),$$

where

R are identical or different, optionally halogen-substituted $C_1$–$C_{18}$ carbon radicals, R' are identical or different $C_1$–$C_4$-alkyl radicals or hydrogen atoms, a is 0, 1, 2 or 3, on average from 0.1 to 2.5 and b is 0, 1, 2, 3 or 4, on average from 0.1 to 3.5.

Examples of unsubstituted radicals R are alkyl radicals such as the methyl, ethyl, n-propyl, iso-propyl, n-butyl, iso-butyl, sec-butyl, tert-butyl, n-pentyl, iso-pentyl, neopentyl, tert-pentyl radical, hexyl radicals such as the n-hexyl radical, heptyl radicals such as the n-heptyl radical, octyl radicals such as the n-octyl radical and iso-octyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; alkenyl radicals such as the vinyl and the allyl radical; cycloalkyl radicals such as cyclopentyl, cyclohexyl, cycloheptyl radicals and methylcyclohexyl radicals; aryl radicals such as the phenyl, naphthyl and anthryl and phenanthryl radicals, alkaryl radicals such a the o-, m-, p-tolyl radicals, xylyl radicals and ethylphenyl radicals; aralkyl radicals such as the benzyl radical, the α- and the β-phenylethyl radical.

Examples of halogen-substituted radicals R are substituted by fluorine and chlorine, such as the 3,3,3-trifluoro-n-propyl radical, the 2,2,2,2',2',2'-hexafluoroisopropyl radical, the heptafluoroisopropyl radical, and haloaryl radicals such as the o-, m-, and p-chlorophenyl radical.

Preferred radicals R are unsubstituted hydrocarbon radicals, in particular those having from 1 to 8 carbon atoms, especially methyl, ethyl, propyl, n-octyl, iso-octyl, vinyl, tolyl and phenyl radicals.

Examples of radicals R' are hydrogen atoms, methyl, ethyl, n-propyl, iso-propyl, n-butyl, sec-butyl, iso-butyl and tert-butyl radicals, in particular methyl and ethyl radicals.

The index a has an average value of from 0.3 to 2.0, in particular from 0.5 to 1.8.

The index b has an average value of from 0.2 to 1.5, in particular from 0.3 to 1.3.

The organopolysiloxane (C) is branched to crosslink in a resin-like manner. The sum of a+b has a value of from 1.5 to 1.9.

The organopolysiloxane (C) is liquid at 25° C. and has a viscosity of from 0.5 to 3,000 mPa·s, in particular from 1 to 500 mPa·s, especially from 2 to 200 mPa·s, at 25° C.

The organopolysiloxane (C) has the formula $$[(RSiO_{3/2})_c(R_2SiO)_d(RSiO(OR'))_e(R_2SiO_{1/2}(OR'))_f(RSiO(OH))_g(R_2SiO_{1/2}(OH))_h]_i \qquad (II),$$

where c has a value of from 0.5 to 0.9, d has a value of from 0 to 0.3, the sum of e+f+g+h has a value of from 0.1 to 0.4, i has a value of from 2 to 100, in particular from 3 to 40, and R and R' are as defined above.

Preferred organopolysiloxanes (C) are those which are obtainable by reaction of methyltrichlorosilane or phenyltrichlorosilane with methanol or ethanol in water, e.g. those of the empirical formula 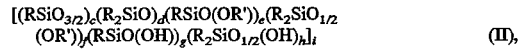 $CH_3Si(OC_2H_5)_{0.8}O_{1.1}$ or $C_6H_5Si(OC_2H_5)_{0.72}O_{1.14}$.

The organopolysiloxanes (C) can contain, owing to the method of preparation, organosilanes such as methyltrimethoxysilane and methyltriethoxysilane, but preferably not more than 30% by weight, in particular not more than 10% by weight.

Preference is given to using, based on 100 parts by weight of gypsum plaster (A), from 0.1 to 8, in particular from 0.3 to 5, parts by weight of organopolysiloxanes (C).

The water-repellent plaster compositions can also contain further organopolysiloxanes which have no hydroxyl and/or alkoxy groups bonded to silicon atoms. Preferably, the amount of further organopolysiloxanes is at most 30 parts by weight, in particular at most 10 parts by weight, based on 100 parts by weight of organopolysiloxanes (C).

The water-repellent plaster compositions can contain further additives (D) which aid the production of shaped plaster articles or improve the properties of the shaped plaster articles. Additives are, for example, fillers such as silicon dioxide, perlite and cellulose fibers and reinforcing material such as glass fibres and glass nonwovens, accelerators such as potassium sulphate and aluminum sulphate, retardants such as proteins or tartrates, air-pore formers such as organosulphonates or organosulphates, plasticizers for the plaster slurry, for example lignin sulphonates, and coupling agents for cardboard such as starch and pulp.

Preference is given to using, based on 100 parts by weight of gypsum plaster (A), at most 25, in particular at most 15, parts by weight of additives (D).

The invention also provides a process for the water-repellent treatment of plaster, wherein (A) 100 parts by weight of gypsum plaster are mixed with (B) from 0.05 to 50 parts by weight of an oxide or hydroxide of alkali or alkaline earth metals or a mixture thereof, and (C) from 0.05 to 20 parts by weight of organopolysiloxane which has hydroxyl and/or alkoxy groups bonded to silicon atoms.

Oxide and/or hydroxide (B), organopolysiloxane (C), and, optionally, additives (D) are added to the plaster prior to the molding of shaped articles. The components can be mixed in any order.

Oxide and/or hydroxide (B) and organopolysiloxane (C) can each be added as powder or as aqueous solution, suspension or emulsion. Oxide and/or hydroxide (B) and organopolysiloxane (C) can be mixed with the dry plaster or with the slurry of water and plaster. Oxide and/or hydroxide (B) can also be mixed with organopolysiloxane (C) and subsequently be added to the plaster (A). Oxide and/or hydroxide (B) can also be mixed with the plaster (A) and subsequently be admixed with organopolysiloxane (C).

If organopolysiloxane (C) is used as emulsion, emulsifiers known are employed.

Suitable anionic emulsifiers are:
1. Alkyl sulphates, particularly those having a chain length of from 8 to 18 carbon atoms, alkyl and alkaryl ether sulphates having from 8 to 18 carbon atoms in the hydrophobic radical and from 1 to 40 ethylene oxide (EO) or propylene oxide (PO) units.
2. Sulphonates, particularly alkylsulphonates having from 8 to 18 carbon atoms, alkylarylsulphonates having from 8 to 18 carbon atoms, taurides, esters and half esters of sulphosuccinic acid with monohydric alcohols or alkylphenols having from 4 to 15 carbon atoms; optionally, these alcohols or alkylphenols can also be ethoxylated with from 1 to 40 EO units.
3. Alkali metal and ammonium salts of carboxylic acids having from 8 to 20 carbon atoms in the alkyl, aryl, alkaryl or aralkyl radical.
4. Partial esters of phosphoric acid and their alkali metal and ammonium salts, particularly alkyl and alkaryl phosphates having from 8 to 20 carbon atoms in the organic radical, alkyl ethers or alkaryl ether phosphates having from 8 to 20 carbon atoms in the alkyl or alkaryl radical and from 1 to 40 EO units.

Particularly suitable nonionic emulsifiers are:
1. Polyvinyl alcohol still containing from 5% to 50%, preferably from 8% to 20%, of vinyl acetate units and having a degree of polymerization of from 500 to 3,000.
2. Alkyl polyglycol ethers, preferably those having from 8 to 40 EO units and alkyl radicals of from 8 to 20 carbon atoms.
3. Alkyl aryl polyglycol ethers, preferably those having from 8 to 40 EO units and from 8 to 20 carbon atoms in the alkyl and aryl radicals.
4. Ethylene oxide/propylene oxide (EO/PO) block copolymers, prefera-ebly those having from 8 to 40 EO or PO units.
5. Fatty acids having from 6 to 24 carbon atoms.
6. Natural materials and their derivatives, such as lecithin, lanolin, saponines, cellulose; cellulose alkyl ethers and carboxyalkylcelluloses whose alkyl groups have up to 4 carbon atoms.
7. Linear organo(poly)siloxanes containing polar groups, in particular those containing alkoxy groups having up to 24 carbon atoms and/or up to 40 EO and/or PO groups.

Particularly suitable cationic emulsifiers are:
1. Salts of primary, secondary and tertiary fatty amines having from 8 to 24 carbon atoms with acetic acid, sulphuric acid, hydrochloric acid and phosphoric acids.
2. Quaternary alkyammonium and alkylbenzeneammonium salts, in particular those whose alkyl groups have from 6 to 24 carbon atoms, in particular the halides, sulphates, phosphates and acetates.
3. Alkylpyridinium, alkylimidazolinium and alkyloxazolinium salts, in particular those whose alkyl chain has up to 18 carbon atoms, especially the halides, sulphates, phosphates and acetates.

Particularly suitable ampholytic emulsifiers are:
1. Long-chain substituted amino acids such as N-alkyl di(aminoethyl)glycine or N-alkyl-2-aminopropionic acid salts.
2. Betaines such as N-(3-acylamidopropyl)-N-N-dimethylammonium salts having a $C_8$-$C_{18}$-acyl radical and alkylimidazolium betaines. Preferred emulsifiers are nonionic emulsifiers, in particular the polyvinyl alcohol listed above under 5. Preferred polyvinyl alcohols still contain from 5% to 20%, in particular from 10% to 15%, of vinyl acetate units and have a degree of polymerization of from 500 to 3,000, in particular from 1,200 to 2,000. The aqueous emulsions of organopolysiloxane (C) contains from 30% to 95% by weight, in particular from 35% to 70% by weight, especially from 45% to 60% by weight, of water. The amount of emulsifier can be from 0.1% to 15% by weight of organopolysiloxane (C). It is preferably from 2% to 10% by weight.

In a preferred embodiment, a foam is produced from water, the above emulsifier and organopolysiloxane (C) and this foam is added to the slurry of water, gypsum plaster (A), oxide and/or hydroxide (B) and, optionally, additives (D). The mixture obtained can be used to produce porous shaped plaster articles.

The organopolysiloxane can be dispersed in water, which can also contain pulp, and subsequently be mixed with the gypsum plaster (A) and oxide and/or hydroxide (B) or an aqueous slurry of (A) and (B) which can also contain (D).

In a further preferred embodiment, water and organopolysiloxane (C) are mixed together with additives (D), in a long tube having turbulent flow and are subsequently added to the gypsum plaster (A) and oxide and/or hydroxide (B).

In the following examples, unless otherwise indicated, a) all amounts are by weight;

b) all pressures are 0.10 Mpa (abs.);

c) all temperatures are 25° C.

EXAMPLES

Production of the Test Specimens

A plaster slurry was produced from x parts by weight of plaster of Paris ($CaSO_4 \cdot \frac{1}{2}H_2O$), 80 parts by weight of water, y parts by weight of calcium hydroxide powder and z parts by weight of any further components indicated in Table I and was poured into circular molds to form test specimens having a diameter of 85 mm and a thickness of 6 mm. After 60 minutes, the solidified test specimens were removed from the molds and dried for 24 hours at 40° C. in a convection oven.

Water Absorption in Accordance With DIN 18180

The test specimens were immersed in a horizontal position in water at 23° C. in such a way that there was 50 mm of water above the test surface. After storage in water for two hours, the test specimens were taken from the water, the water adhering to the surface was removed and the increase in mass was determined by weighing. The water absorption in percent by mass is given in Table I.

Organopolysiloxane (C)

Use was made of a liquid organopolysiloxane of the empirical formula $CH_3Si(OC_2H_5)_{0.8}O_{1.1}$ having a viscosity of 21 mPa·s at 25° C.

Composition of the Organopolysiloxane Emulsion

An emulsion was produced from 240 parts by weight of the above organopolysiloxane, 120 parts by weight of a 10% strength by weight aqueous solution of polyvinyl alcohol which still contained 12% of vinyl acetate units and had a degree of polymerization of 1,600 and 120 parts by weight of deionized water.

Examples 1 to 9

In the following table, examples 1 and 6 are not according to the invention.

TABLE I

| Example | X | Y | Z | Hydrophobicizing Component | Water absorption in % by weight in accordance with DIN 18180 |
|---|---|---|---|---|---|
| 1 | 98 | 2 | — | | 43.4% |
| 2 | 98 | 2 | 0.5 | Organopolysiloxane | 9.7% |
| 3 | 98 | 2 | 2.0 | Organopolysiloxane | 3.6% |
| 4 | 96 | 4 | 0.5 | Organopolysiloxane | 7.7% |
| 5 | 96 | 4 | 1.0 | Organopolysiloxane emulsion | 3.5% |
| 6 | 92 | 8 | — | | 41.0% |
| 7 | 92 | 8 | 0.5 | Organopolysiloxane | 2.9% |
| 8 | 92 | 8 | 2.0 | Organopolysiloxane | 1.6% |
| 9 | 92 | 8 | 1.0 | Organopolysiloxane emulsion | 1.5% |

Example 10

4 parts by weight of a mixture of 100 parts by weight of the above organopolysiloxane and 40 parts by weight of calcium hydroxide were added to a mixture of 100 parts by weight of plaster of Paris and 80 parts by weight of water. From this slurry, test specimens were cast and dried as described above. The water absorption in accordance with DIN 18180 was 3.1%

Example 11

From a mixture of 99 parts by weight of plaster of Paris, 1 part by weight of sodium hydroxide, 80 parts by weight of water and 1 part by weight of the above organopolysiloxane emulsion, test specimens were cast and dried as described above. The water absorption in accordance with DIN 18180 was 3.6%.

Example 12

From a mixture of 98 parts by weight of plaster of Paris, 2 parts by weight of calcium hydroxide, 80 parts by weight of water and 3 parts by weight of the above organopolysiloxane emulsion, test specimens were cast and dried as described above. The water absorption in accordance with DIN 18180 was 3.4%.

Example 13 (not according to the invention)

From a mixture of 90 parts by weight of plaster of Paris, 10 parts by weight of calcium hydroxide, 80 parts by weight of water and 2 parts by weight of a linear polydimethylsiloxane oil having a viscosity of 950 mPa·s, test specimens were cast and dried as described above. The water absorption in accordance with DIN 18180 was 47.9%.

Example 14 (not according to the invention)

Example 13 was repeated, except that only 0.5 part by weight of the linear polydimethylsiloxane oil was used. The water absorption in accordance with DIN 18180 was 47.9%.

Example 15

30 parts by weight of water, 0.1 part by weight of ether sulphate (Zeliquid$^R$ LP 2 from Hoechst AG, Germany) and 2 parts by weight of the above organopolysiloxane were mixed in a foam producer at 1,200 revolutions/minute. The foam obtained was mixed with a plaster slurry consisting of 90 parts by weight of plaster of Paris, 10 parts by weight of calcium hydroxide and 50 parts by weight of water. Subsequently, test specimens were cast and dried as described above. The water absorption in accordance with DIN 18180 was 2.9%.

What is claimed is:

1. Water-repellent plaster compositions comprising (A) 100 parts by weight of gypsum plaster, (B) from 0.05 to 50 parts by weight of an oxide or hydroxide of alkali or alkaline earth metals or mixtures thereof, and (C) from 0.05 to 20 parts by weight of an organopolysiloxane which has hydroxyl and/or alkoxy groups bonded to silicon atoms.

2. Water-repellent plaster compositions according to claim 1, wherein component (B) is selected from the group consisting of CaO, MgO, $Ca(OH)_2$, $Mg(OH)_2$ and NaOH.

3. Water-repellent plaster compositions according to claim 1, wherein, based on 100 parts by weight of gypsum plaster (A), from 0.1 to 35 parts by weight of an oxide or a hydroxide (B) are present.

4. Water-repellent plaster compositions according to claim 1, wherein the organopolysiloxane (C) is made up of units of the formula $$R_a(OR')_bSiO_{(4-a-b)/2} \qquad (I),$$

where

R are identical or different, optionally halogen-substituted $C_1$–$C_{18}$-hydrocarbon radicals, R' are identical or different $C_1$–$C_4$-alkyl radicals or hydrogen atoms, a is 0, 1, 2 or 3, b is 0, 1, 2, 3 or 4, with the proviso that a is on average from 0.1 to 2.5 and b is on average 0.1 to 3.5 per molecule of organopolysiloxane (C) made up of units of formula (I).

5. Water-repellent plaster compositions according to claim 1, wherein, based on 100 parts by weight of gypsum plaster (A), from 0.1 to 8 parts by weight of organopolysiloxanes (C) are used.

6. Process for the water-repellent treatment of plaster, wherein (A) 100 parts by weight of gypsum plaster are admixed with (B) from 0.05 to 50 parts by weight of an oxide or hydroxide of alkali or alkaline earth metals or a mixture thereof, and (C) from 0.05 to 20 parts by weight of organopolysiloxane which has hydroxyl and/or alkoxy groups bonded to silicon atoms.

7. Process according to claim 6, wherein the organopolysiloxane (C) is present as an aqueous emulsion.

* * * * *